United States Patent
Cho (10) Patent No.: US 9,731,986 B2
(45) Date of Patent: Aug. 15, 2017

(54) APPARATUS FOR WATER TREATMENT USING CAPACITIVE DEIONIZATION AND METHOD FOR CONTROLLING THE SAME

(71) Applicant: COWAY CO., LTD., Chungcheongnam-do (KR)

(72) Inventor: Young-Gun Cho, Seoul (KR)

(73) Assignee: Coway Co., Ltd (KR)

( * ) Notice: Subject to any disclaimer, the term of this patent is extended or adjusted under 35 U.S.C. 154(b) by 516 days.

(21) Appl. No.: 14/361,226

(22) PCT Filed: Dec. 27, 2012

(86) PCT No.: PCT/KR2012/011564
§ 371 (c)(1),
(2) Date: May 28, 2014

(87) PCT Pub. No.: WO2013/100628
PCT Pub. Date: Jul. 4, 2013

(65) Prior Publication Data
US 2014/0353167 A1 Dec. 4, 2014

(30) Foreign Application Priority Data

Dec. 29, 2011 (KR) .................. 10-2011-0145576
Dec. 18, 2012 (KR) .................. 10-2012-0148516

(51) Int. Cl.
C02F 1/46 (2006.01)
C02F 1/469 (2006.01)

(52) U.S. Cl.
CPC .. *C02F 1/4691* (2013.01); *C02F 2201/46135* (2013.01); *C02F 2209/10* (2013.01); *C02F 2209/105* (2013.01); *C02F 2303/22* (2013.01)

(58) Field of Classification Search
CPC ............. C02F 1/4691; C02F 2209/105; C02F 2209/10; C02F 2303/22; C02F 2201/46135
See application file for complete search history.

(56) References Cited

U.S. PATENT DOCUMENTS

| 5,954,937 A | 9/1999 | Farmer |
| 8,470,152 B2 * | 6/2013 | Sullivan ............... C02F 1/4691 204/520 |

(Continued)

FOREIGN PATENT DOCUMENTS

| CN | 101654295 | 2/2010 |
| JP | 2000-024648 | 1/2000 |
| WO | WO 2008/094367 | 8/2008 |

OTHER PUBLICATIONS

European Search Report dated Aug. 20, 2015 issued in counterpart application No. 12863174.4-1351, 6 pages.

(Continued)

*Primary Examiner* — Arun S Phasge
(74) *Attorney, Agent, or Firm* — The Farrell Law Firm, P.C.

(57) ABSTRACT

There are provided an apparatus for water treatment using capacitive deionization and a method for controlling the same. The apparatus for water treatment using capacitive deionization includes a first filter unit and a second filter unit allowing dissolved solids included in an introduced fluid to be adsorbed on electrodes to generate purified water when a water purification voltage is applied to the electrodes, and allowing the dissolved solids adsorbed on the electrodes to be desorbed to generate regenerated water when a regeneration voltage is applied to the electrodes, respectively, and a controller iteratively alternatively applying the water purification voltage and the regeneration voltage to the first filter (Continued)

unit and the second filter unit to generate purified water having a pre-set target total dissolved solids (TDS) value.

8 Claims, 5 Drawing Sheets

(56) References Cited

U.S. PATENT DOCUMENTS

| | | |
|---|---|---|
| 2008/0057398 A1 | 3/2008 | Wei et al. |
| 2010/0044244 A1 | 2/2010 | Lee et al. |
| 2010/0065438 A1 | 3/2010 | Sullivan |
| 2011/0147212 A1 | 6/2011 | Kim et al. |

OTHER PUBLICATIONS

PCT/ISA/237 Written Opinion issued on PCT/KR2012/011564 (pp. 5).
Chinese Office Action dated Mar. 27, 2015 issued in counterpart application No. 201280064453.X.

* cited by examiner

APPARATUS FOR WATER TREATMENT USING CAPACITIVE DEIONIZATION AND METHOD FOR CONTROLLING THE SAME

TECHNICAL FIELD

The present invention relates to an apparatus for water treatment using capacitive deionization and a method for controlling the same, and more particularly, to an apparatus for water treatment using capacitive deionization capable of continuously generating purified water and a method for controlling the same.

BACKGROUND ART

In general, an apparatus for water treatment using capacitive deionization (CDI) may include a deionization filter including electrodes having nano-scale air gaps, and when a voltage is applied to the electrodes, the electrodes are polarized to allow ionic compounds in a medium to be adsorbed onto surfaces thereof to thereby be removed. With a medium containing dissolved ions flowing between two electrodes, a positive electrode and a negative electrode of the deionization filter, when DC power having a low potential difference is applied thereto, anion components of the dissolved ions may be adsorbed on the positive electrode and cation components thereof may be adsorbed on the negative electrode and concentrated thereon, respectively. Thereafter, when a current flows in a reverse direction to short-circuit the two electrodes, the concentrated ions may be desorbed from the respective electrodes. The apparatus for water treatment using capacitive deionization has advantages in that high energy efficiency is obtained because a high potential difference is not used, hazardous ions can be removed together with hardness components in the case of ion adsorption, and chemicals are not required in regeneration of the electrodes. However, in the related art apparatus for water treatment using capacitive deionization, since the saturated electrodes are regenerated through a regeneration process after the deionization process is finished, continuous deionization is not possible.

DISCLOSURE OF INVENTION

Technical Problem

An aspect of the present invention provides an apparatus for water treatment using capacitive deionization capable of continuously generating purified water and a method for controlling the same.

Solution to Problem

According to an aspect of the present invention, there is provided an apparatus for water treatment using capacitive deionization including: a first filter unit and a second filter unit allowing dissolved solids included in an introduced fluid to be adsorbed on electrodes to generate purified water when a water purification voltage is applied to the electrodes, and allowing the dissolved solids adsorbed on the electrodes to be desorbed to generate regenerated water when a regeneration voltage is applied to the electrodes, respectively; and a controller iteratively alternatively applying the water purification voltage and the regeneration voltage to the first filter unit and the second filter unit to generate purified water having a pre-set target total dissolved solids (TDS) value.

Here, the first filter unit and the second filter unit may include: an inlet allowing the fluid to be introduced therethrough; a purified water outlet allowing the purified water to be discharged; a regeneration water outlet allowing the regenerated water to be discharged; an electrode applying a voltage to the fluid; and a water discharge valve opening the purified water outlet and closing the regenerated water outlet when the water purification voltage is applied to the electrode, and closing the purified water outlet and opening the regenerated water outlet when the regeneration voltage is applied to the electrodes.

Here, the controller may perform a water purification operation to apply the water purification voltage during a pre-set water purification period and a regeneration operation to apply a regeneration voltage during a pre-set regeneration period according to a pre-set operation pattern.

Here, when the regeneration period is reached, the controller may start the water purification operation of the second filter unit during a water purification operation of the first filter unit.

Here, the operation pattern may be iterative operations of first applying the water purification voltage to the first filter unit, applying the regeneration voltage to the second filter unit when a first time is reached, stopping the application of the regeneration voltage to the second filter unit when a second time is reached, applying the water purification voltage to the second filter unit when a third time is reached, applying the regeneration voltage to the first filter unit when a fourth time is reached, stopping the application of the regeneration voltage to the first filter unit when a fifth time is reached, and applying the water purification voltage to the first filter unit when a sixth time is reached, wherein the operations are iteratively performed.

Here, the apparatus for water treatment using capacitive deionization may further include: a TD sensor unit measuring a TDS concentration within the first filter unit to generate a first measured concentration, and measuring a TDS concentration within the second filter unit to generate a second measured concentration, wherein the controller applies the water purification voltage and the regeneration voltage to the first filter unit and the second filter unit according to the first measured concentration and the second measured concentration.

After the water purification voltage is applied to the first filter unit, the controller may apply the water purification voltage to the second filter unit when the first measured concentration is equal to or less than a pre-set water purification reference value, the controller may apply the regeneration voltage to the first filter unit when the first measured concentration is equal to or less than a pre-set regeneration reference value, the controller may apply the water purification voltage to the first filter unit when the second measured concentration is equal to or less than the water purification reference value, the controller may apply the regeneration voltage to the second filter unit when the second measured concentration is equal to or less than the regeneration reference value, and the controller may apply the water purification voltage to the second filter unit when the first measured concentration is equal to or less than the water purification reference value, wherein the controller iteratively performs the operations.

According to another aspect of the present invention, there is provided a method for controlling an apparatus for water treatment using capacitive deionization, including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively, including: applying the water purification voltage to the first filter unit; applying the water purification voltage to the first filter unit; applying the regeneration voltage to the second filter unit when a first time is reached; stopping the application of the regeneration voltage to the second filter unit when a second time is reached; applying the water purification voltage to the second filter unit when a third time is reached; applying the regeneration voltage to the first filter unit when a fourth time is reached; stopping the application of the regeneration voltage to the first filter unit when a fifth time is reached; and applying the water purification voltage to the first filter unit when a sixth time is reached.

According to another aspect of the present invention, there is provided a method for controlling an apparatus for water treatment using capacitive deionization including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively, including: applying the water purification voltage to the first filter unit; applying the water purification voltage to the second filter unit when a target total dissolved solids (TDS) concentration of the first filter unit is equal to or less than a pre-set water purification reference value; applying the regeneration voltage to the first filter unit when the TDS concentration of the first filter unit is equal to or less than a pre-set regeneration reference value; applying the water purification voltage to the first filter unit when a TDS concentration of the second filter unit is equal to or less than the water purification reference value; applying the regeneration voltage to the second filter unit when the TDS concentration of the second filter unit is equal to or less than the regeneration reference value; and applying the water purification voltage to the second filter unit when the TDS concentration of the first filter unit is equal to or less than the water purification reference value.

The foregoing technical solutions do not fully enumerate all of the features of the present invention. The foregoing and other objects, features, aspects and advantages of the present invention will become more apparent from the following detailed description of the present invention when taken in conjunction with the accompanying drawings.

Advantageous Effects of Invention

In the case of the apparatus for water treatment using capacitive deionization and the method for controlling the same, purified water can be continuously generated. In particular, although purified water is continuously ejected (or discharged), purified water having a uniform total dissolved solids (TDS) removal rate can be generated.

BEST MODE FOR CARRYING OUT THE INVENTION

Hereinafter, embodiments of the present invention will be described in detail with reference to the accompanying drawings such that they can be easily practiced by those skilled in the art to which the present invention pertains. In describing the present invention, if a detailed explanation for a related known function or construction is considered to unnecessarily divert from the gist of the present invention, such explanation will be omitted but would be understood by those skilled in the art. Also, similar reference numerals are used for the similar parts throughout the specification.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements.

Figure 1:
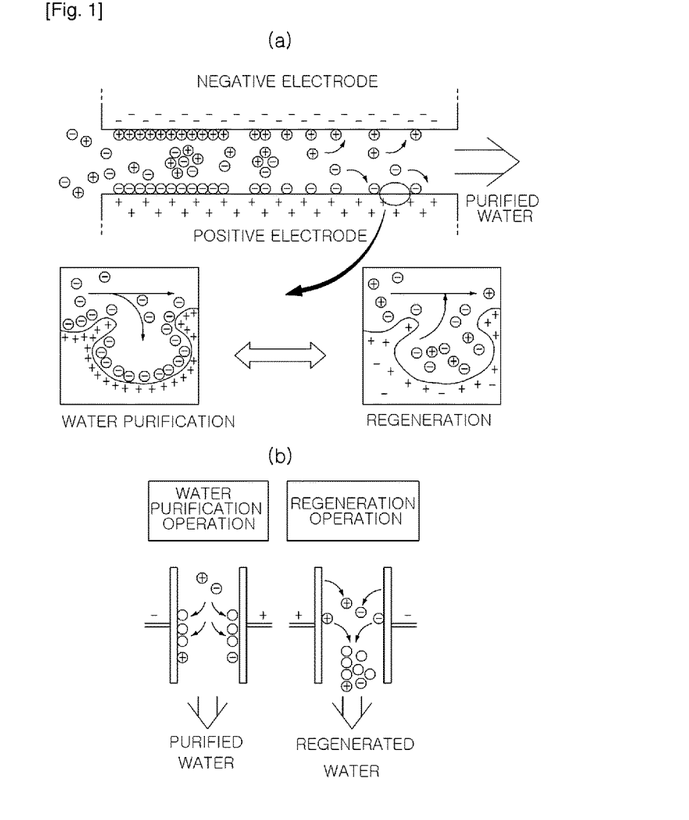
FIG. 1 is a schematic view illustrating a water purification and regeneration principle of a general apparatus for water treatment using capacitive deionization.

FIG. 1 is a schematic view illustrating a water purification and regeneration principle of a general apparatus for water treatment using capacitive deionization. As illustrated in FIG. 1(a), raw water introduced to a filter unit of the apparatus for water treatment using capacitive deionization may include various types of dissolved solids (DS). Charged dissolved solids like ions may migrate toward electrodes according to electric attraction of an electric field applied to the electrodes and may be adsorbed on the electrodes. Namely, dissolved solids having a positive charge may be adsorbed on a negative electrode and dissolved solids having a negative charge may be adsorbed on a positive electrode. Thus, the filter unit may have a flow channel allowing raw water to flow therein and electrodes applying an electric field to the flow channel to remove the charged dissolved solids such as ions contained in the raw water from the raw water. Namely, the filter unit may remove the charged dissolved solids to generate clean purified water and adjust a quantity of ions contained in the purified water.

However, as the amount of dissolved solids such as ions, or the like, adsorbed on the electrodes is increased, electrical attraction of the electrodes may weaken. Namely, when an excessive quantity of dissolved solids is adsorbed on the electrodes, a quantity of dissolved solids the electrodes may be able to remove may be reduced, resulting in a failure to remove a sufficient quantity of dissolved solids. In this case, as illustrated in FIG. 1A, the dissolved solids adsorbed on the electrodes may be desorbed, and the desorbed dissolved solids may be discharged together with the introduced raw water to the outside. Namely, a voltage having an opposite polarity of that of the voltage applied to adsorb the dissolved solids may be applied to the electrodes to desorb the dissolved solids from the electrodes. Thereafter, when desorption of the dissolved solids from the electrodes is completed, the electrodes may be used to adsorb the dissolved solids.

Referring to FIG. 1B, during a water purification operation, a pre-set water purification voltage may be applied to the electrodes to remove dissolved solids included in introduced raw water. Namely, dissolved solids may be removed from the raw water to generate clean purified water. In addition, a quantity of the dissolved solids the filter unit is to remove may be adjusted by regulating a magnitude of the water purification voltage, or the like, so a total quantity of the dissolved solids, i.e., total dissolved solids (TDS), included in unit volume of the purified water may be adjusted to a per-set target TDS value.

Here, when the water purification operation is continuously performed, the electrodes may no longer be able to remove a sufficient quantity of dissolved solids, and in this case, a regeneration operation may be performed to desorb dissolved solids adsorbed on the electrodes. Namely, the dissolved solids adsorbed on the electrodes may be desorbed by using electrical repulsive force by applying a regeneration voltage having the opposite polarity of that of the water purification voltage. Thereafter, the desorbed dissolved solids may be discharged together with the introduced raw water to the outside so as to be removed. Regenerated water generated according to the regeneration operation is raw water including desorbed dissolved solids, which may have a TDS value higher than that of general raw water.

Thus, in the case of using the apparatus for water treatment using capacitive deionization, after the water purification operation is performed for a predetermined period of time to generate purified water, the regeneration operation is performed periodically. Namely, by performing the regeneration operation in the middle of the water purification operation, a dissolved solids removal rate of the apparatus for water treatment using capacitive deionization can be maintained at a predetermined level.

In particular, the apparatus for water treatment using capacitive deionization may include two or more filter units in order to continuously generate purified water. In this case, while one filter unit performs a water purification operation, the other may be controlled to perform a regeneration operation. When the one filter unit, which has performed the water purification operation, can no longer perform the water purification operation, the other filter unit, which has performed the regeneration operation, may perform a water purification operation. Here, the one filter unit, which has performed the water purification operation, may perform a regeneration operation in preparation for a next water purification operation. In this manner, purified water may be continuously generated by alternating the filter unit performing the water purification operation and the filter unit performing the regeneration operation.

Figure 2:
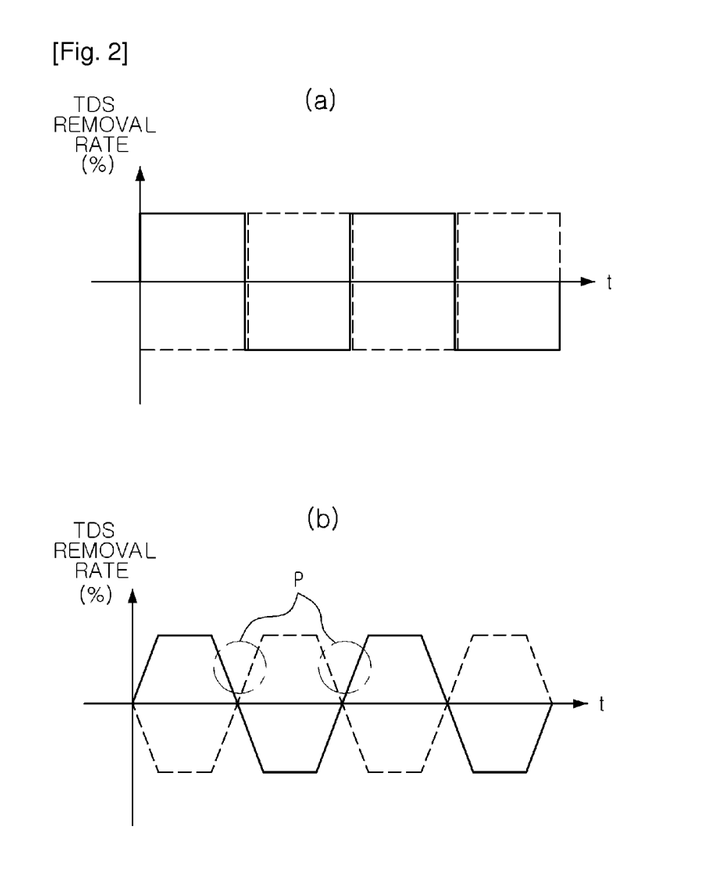
FIG. 2 is a schematic view illustrating an operation of the apparatus for water treatment using capacitive deionization.

FIG. 2 is a graph showing an operation of the apparatus for water treatment using capacitive deionization including two or more filter units, in which the horizontal axis represents time and the vertical axis represents a TDS removal rate. Here, when the water purification voltage is applied, the filter unit removes dissolved solids included in raw water, so the TDS removal rate is indicated as a positive number, while when the regeneration voltage is applied, dissolved solids adsorbed on the electrodes of the filter unit are desorbed and discharged to raw water, the TDS removal rate is indicated as a negative number.

FIG. 2A is a graph showing an operation of an ideal apparatus for water treatment using capacitive deionization including two or more filter units. In the ideal apparatus for water treatment using capacitive deionization, when the water purification voltage is applied to the filter unit, dissolved solids may be removed immediately at a TDS removal rate corresponding to the water purification voltage. Also, when the regeneration voltage is applied to the filter unit, the dissolved solids may be desorbed at a rate corresponding to the magnitude of the regeneration voltage. Namely, since the ideal apparatus for water treatment using capacitive deionization does not have a transition time required to reach the target TDS removal rate after the water purification voltage is applied, purified water having a uniform TDS removal rate can be constantly provided.

However, in actuality, the apparatus for water treatment using capacitive deionization operates as shown in FIG. 2B, and when the water purification voltage is applied, a predetermined TDS removal rate may be reached after the lapse of a transition time. Also, when the regeneration voltage is applied, dissolved solids may not be desorbed at a rate corresponding to the regeneration voltage until the transition time has passed. Thus, the apparatus for water treatment using capacitive deionization including two or more filter units may involve a time slot, such as a P region, during which a TDS removal rate of purified water is lower than the target TDS value.

Figure 3:
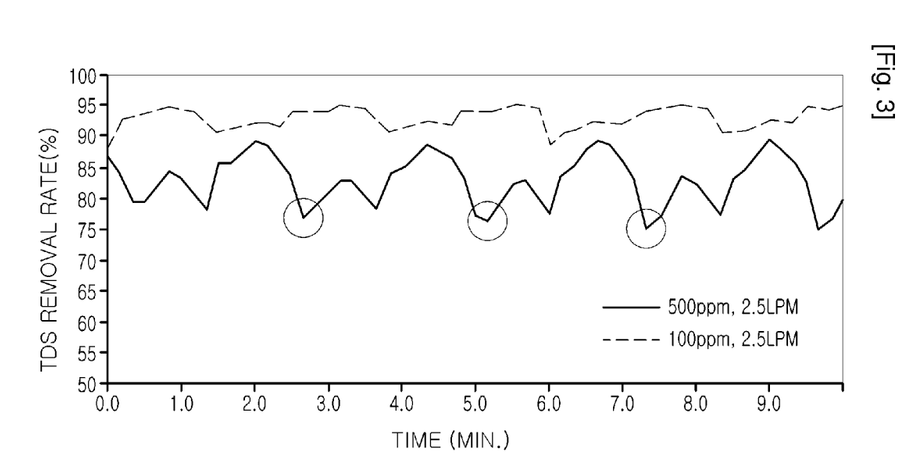
FIG. 3 is a graph showing a total dissolved solids (TDS) removal rate of the related art apparatus for water treatment using capacitive deionization.

FIG. 3 is a graph showing a TDS removal rate of the actual apparatus for water treatment using capacitive deionization of FIG. 2B. Referring to FIG. 3, when TDS of raw water is as low as 100 ppm, the overall TDS removal rate is not greatly affected in spite of the presence of P region of FIG. 2B. In comparison, it can be seen that, when TDS is as high as 500 ppm, the TDS removal rate is significantly dropped in the sections corresponding to the P regions periodically. Thus, a technique for complementing it is required.

Figure 4:
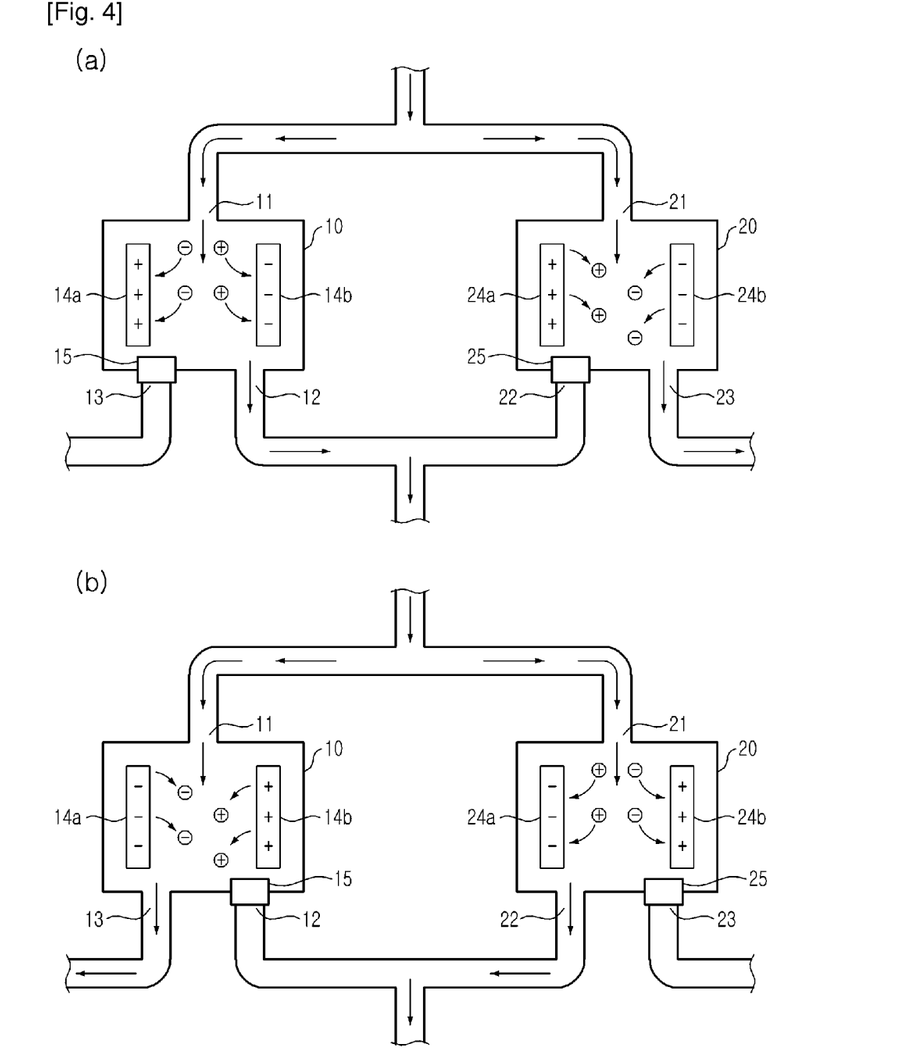
FIG. 4 is a schematic view illustrating an operation of an apparatus for water treatment using capacitive deionization according to an embodiment of the present invention.
Figure 5:
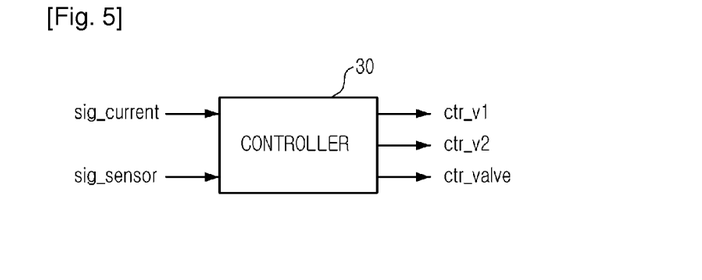
FIG. 5 is a block diagram of a controller of the apparatus for water treatment using capacitive deionization according to an embodiment of the present invention.

FIGS. 4 and 5 are schematic views illustrating an apparatus for water treatment using capacitive deionization according to an embodiment of the present invention.

Referring to FIGS. 4 and 5, the apparatus for water treatment using capacitive deionization according to an embodiment of the present invention may include a first filter unit 10, a second filter unit 20, and a controller 30.

Hereinafter, the apparatus for water treatment using capacitive deionization according to an embodiment of the present invention will be described with reference to FIGS. 4 and 5.

First, referring to FIG. 4, the apparatus for water treatment using capacitive deionization may include the first filter unit 10 and the second filter unit 20, and raw water may be introduced through inlets 11 and 21 of the first filter unit 10 and the second filter unit 20. Thereafter, a water purification voltage may be applied to electrodes 14a, 14b, 24a, and 24b of the first filter unit 10 and the second filter unit 20 to remove dissolved solids included in the raw water or a regeneration voltage may be applied to desorb the dissolved solids adsorbed on the electrodes 14a, 14b, 24a, and 24b. Here, purified water obtained by removing the dissolved solids included in the raw water may be discharged through purified water outlets 12 and 22, and regeneration water including the dissolved solids adsorbed on the electrodes 14a, 14b, 24a, and 24b may be discharged to the outside through regeneration outlets 13 and 23.

Here, the outlets through which the purified water and the regeneration water are discharged may be controlled by ejection valves 15 and 25. For example, when the water purification voltage is applied to the first filter unit 10, the purified water outlets 12 may be opened and the regeneration outlet 13 may be closed. Conversely, when the regeneration voltage is applied to the first filter unit 10, the purified water outlet 12 may be closed and the regeneration outlet 13 may be opened. As illustrated in FIG. 4, the second filter unit 20 may also include the ejection valve 25, and the ejection valve 25 of the second filter unit 20 may perform the same operation as that of the first filter unit 10.

FIG. 4A illustrates a configuration in which the first filter unit 10 performs a water purification operation and the second filter unit 20 performs a regeneration operation. As discussed above, purified water generated in the first filter unit 10 may be discharged through the purified water outlet 12, and regeneration water generated in the second filter unit 20 may be discharged to the outside through the regeneration outlet 23. Thereafter, when the electrodes 14a and 14b of the first filter unit 10 are saturated and can no longer adsorb dissolved solids, the first filter unit 10 performs a regeneration operation and the second filter unit 20 performs a water purification operation as illustrated in FIG. 4B.

Here, the water purification operation and the regeneration operation performed by the first filter unit 10a and the second filter unit 20 may be controlled by the controller 30. Namely, the controller 30 illustrated in FIG. 5 may be provided in the apparatus for water treatment using capacitive deionization, in which the controller may output voltages applied to the first filter unit 10 and the second filter unit 20 and control signals for controlling the operation of the ejection valve 15.

As illustrated in FIG. 5, the control signals may include ctr_v1, ctr_v2, and ctr_valve. Here, ctr_v1 may be a control signal with respect to the electrodes 14a and 14b of the first filter unit 10, ctr_v2 may be a control signal with respect to the electrodes 24a and 24b of the second filter unit 20, and ctr_valve may be a control signal with respect to the ejection valves 15 and 25.

Also, the controller 30 may receive a magnitude (sig_current) of a current flowing when a voltage is applied to both ends of the electrodes 14a, 14b, 24a, and 25b of the first filter unit 10 and the second filter unit 20. Since the magnitude (sig_current) of the current is proportional to an amount of dissolved solids included in the raw water, a TDS value within the filter unit may be obtained by measuring the magnitude (sig_current) of the current. In addition, the controller 30 may include a TDS sensor unit (not shown) for measuring a TDS value within the filter unit, and may directly measure a TDS value within the filter unit upon receiving a sensing value (sig_sensor) from the TDS sensor unit.

Here, the controller 30 may selectively apply the water purification voltage and the regeneration voltage to the first filter unit 10 and the second filter unit 20 to allow a TDS included in discharged purified water to have a pre-set target TDS value.

Figure 6:
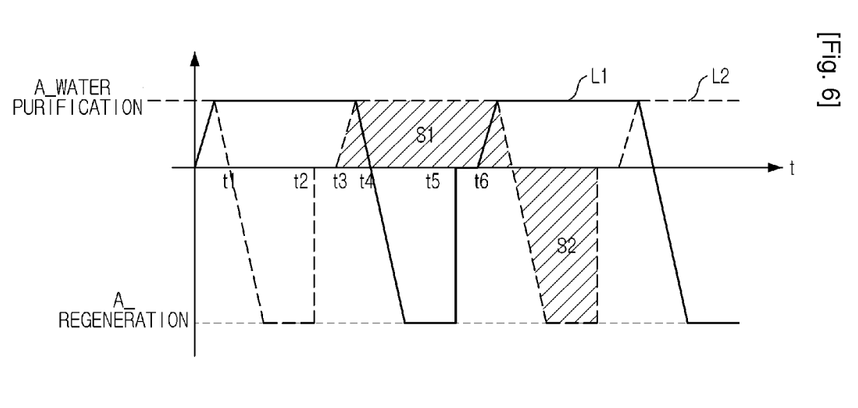
FIG. 6 is a graph showing a TDS removal rate of the apparatus for water treatment using capacitive deionization according to an embodiment of the present invention.

FIG. 6 is a graph showing an embodiment in which the controller 30 controls operations of the first filter unit 10 and the second filter unit 20. Here, L1 is a graph representing an operation of the first filter unit 10, and L2 is a graph representing an operation of the second filter unit 20. Here, A_WATER PURIFICATION denotes a TDS removal rate for generating purified water having a target TDS value, and A_REGENERATION denotes a maximum regeneration rate of the filter unit.

Referring to FIG. 6, the controller 30 may perform a water purification operation to apply a water purification voltage during a pre-set water purification period and a regeneration operation to apply a regeneration voltage during a pre-set regeneration period according to a pre-set operation pattern. Here, the regeneration period may be shorter than the water purification period, and an amount (S1) of TDS removed by the second filter unit 20 during the water purification period and an amount (S2) of TDS desorbed from the second filter unit 20 during the regeneration period may be equal. This is the same in the case of the first filter unit 10.

In detail, according to the operation pattern, the water purification voltage may be applied to the first filter unit 10 (t=0), and thereafter, when a first time is reached (t=t1), the regeneration voltage may be applied to the second filter unit 20. Namely, when t is 0 (t=0), the water purification voltage may be applied to the first filter unit 10 to start a water purification operation, and when the first time is reached (t=t1), the regeneration voltage may be applied to the second filter unit 20 to start the regeneration operation.

Thereafter, when a second time is reached (t=t2), the application of the regeneration voltage to the second filter unit 20 may be stopped. As discussed above, since a duration required for the regeneration operation is shorter than a duration required for the water purification operation, when the regeneration operation of the second filter unit 20 is completed, the application of the regeneration voltage may be first stopped.

Thereafter, when a third time is reached (t=t3), the water purification voltage may be applied to the second filter unit 20. Namely, in a state in which the first filter unit 10 performs the water purification operation, the second filter unit 20 may start a water purification operation. As illustrated in FIG. 6, since the TDS removal rate of the first filter unit 10 is gradually decreased, the second filter unit 20 may perform a water purification operation before the TDS removal rate of the first filter unit 10 is decreased. Thus, the second filter unit 20 may also generate purified water having the target TDS value when the TDS removal rate of the first filter unit 10 starts to be decreased. Namely, in the related art, the second filter unit 20 starts to operate after the TDS removal rate of the first filter unit 10 is completely decreased, failing to provide purified water having a high (low?) TDS value to a user, or the like. In comparison, in the present embodiment, since the second filter unit 20 starts to operate before the TDS removal rate of the first filter unit 10 is decreased, and thus, the TDS of the purified water can be maintained at the target TDSS.

Thereafter, when a fourth time is reached (t=t4), the generation voltage may start to be applied to the first filter unit 10. Namely, after the second filter unit 20 performs the water purification operation, the regeneration voltage may be applied to the first filter unit 10 to enable the first filter unit 10 to perform a regeneration operation.

Thereafter, when a fifth time is reached (t=t5), similarly, the regeneration operation of the first filter unit 10 is completed, so the application of the regeneration voltage to the first filter unit 10 may be stopped.

Also, when a sixth time is reached (t=t6), before the water purification operation of the second filter unit 20 is completed, the water purification voltage may be applied to the first filter unit 10 to enable the first filter unit 10 to perform the water purification operation. Thereafter, the first filter unit 10 and the second filter unit 20 may iteratively perform the operations from t=0 to t=t6 to continuously generate purified water.

In this manner, when the first filter unit 10 and the second filter unit 20 operate according to the pre-set operation pattern, purified water provided from the first filter unit 10 and the second filter unit 20 may have a uniform target TDS value all the time. In particular, when the first filter unit 10 and the second filter unit 20 operate according to the operation pattern, the time slot during which purified water having a TDS value lower than the target TDS value is provided to the user, like the P region in FIG. 2B, may not be generated.

In addition, besides the controlling according to the pre-set operation pattern, the application of the first filter unit 10 and the second filter unit 20 may be controlled according to a TDS concentration within the first filter unit and a TDS concentration within the second filter unit.

Here, as discussed above, a TDS concentration within the first filter unit 10 and a TDS concentration within the second filter unit 20 may be measured by using the TDS sensor (not shown). Namely, a TDS concentration within the first filter unit 10 may be measured by using the TDS sensor unit to generate a first measured concentration, and a TDS concentration within the second filter unit 20 by using the TDS sensor unit to generate a second measured concentration. Here, the first measured concentration and the second measured concentration measured by the TDS sensor unit may be transmitted as sensing values (sign_sensor) to the controller 30. Besides, a TDS concentration within the first filter unit 10 and that of the second filter unit 20 may be measured based on strength of a current flowing in both ends of the electrodes by a voltage applied to the first filter unit 10 and the second filter unit 20. Hereinafter, another embodiment of controlling operations of the first filter unit 10 and the second filter unit 20 by the controller 30 will be described.

Figure 7:
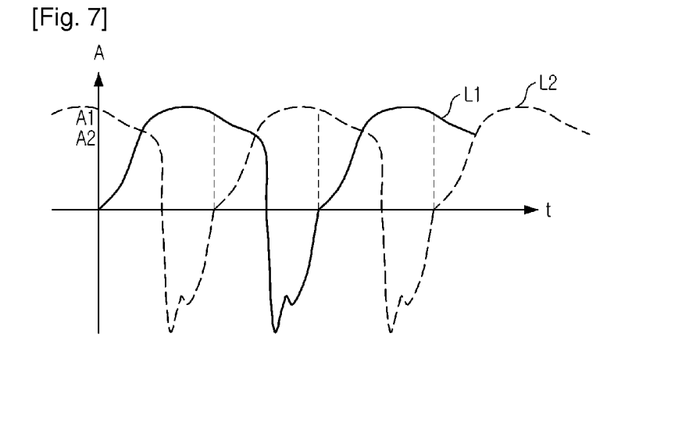
FIG. 7 is a graph showing a TDS removal rate of the apparatus for water treatment using capacitive deionization according to another embodiment of the present invention.

Referring to FIG. 7, after applying the water purification voltage to the first filter unit 10, the controller 30 may continuously check whether a TDS concentration, i.e., the first measured concentration, of the first filter unit 10 is dropped to be equal to or less than a pre-set water purification reference value A1. When the first measured concentration is dropped to be equal to or less than the water purification reference value A1, the controller 30 may apply the water purification voltage to the second filter unit 20. Namely, when a TDS removal rate of the first filter unit 10 is dropped to be equal to or less than the water purification reference value A1, it may be determined that the electrodes 14a and 14b of the first filter unit 10 are saturated to degrade TDS removal capability of the first filter unit 10. Thus, before the TDS removal capability of the first filter unit 10 is completely degraded, the second filter unit 20 may first start to perform a water purification operation such that the second filter unit 20 has a sufficient TDS removal rate when the TDS removal rate of the first filter unit 10 is completely decreased.

Thereafter, when the first measured concentration is dropped to be equal to or less than a pre-set regeneration reference value A2, a regeneration voltage may be applied to the first filter unit 10. Namely, when the first measured concentration is measured to have a level equal to or less than the regeneration reference value A2, it may be determined that the electrodes 14a and 14b of the first filter unit 10 are saturated so dissolved solids cannot be removed. Thus, a regeneration voltage may be applied to the electrodes 14a and 14b of the first filter unit 10 to enable the first filter unit 10 to perform a regeneration operation.

Thereafter, when the second measured concentration is equal to or less than the water purification reference value (A), the water purification voltage may be applied to the first filter unit 10. As discussed above, when the TDS removal rate of the second filter unit 20 performing the water purification operation is decreased, the first filter unit 10 starts to perform a water purification operation in advance in preparation for saturation of the electrodes 24a and 24b of the second filter unit 10.

Thereafter, when the second measured concentration is equal to or less than the regeneration reference value A2, the regeneration voltage may be applied to the second filter unit 20 to enable the second filter unit 20 to perform a regeneration operation. As discussed above, when a TDS removal rate of the second filter unit 20 is measured to be less than the regeneration reference value A2, it may be determined that the electrodes 24a and 24b of the second filter unit 20 are saturated, so the regeneration voltage may be applied to the second filter unit 20 to enable the second filter unit 20 to perform a regeneration operation.

Thereafter, when the first measured concentration is equal to or less than water purification reference value A1, the operation of applying the water purification voltage to the second filter unit 20 may be iteratively performed to continuously generate purified water.

A method for controlling an apparatus for water treatment using capacitive deionization according to an embodiment of the present invention is related to an apparatus for water treatment using capacitive deionization including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively. In detail, the method for controlling an apparatus for water treatment using capacitive deionization will be described with reference to FIG. 6.

First, an operation of applying the water purification voltage to the first filter unit may be performed (t=0). Thus, the first filter unit may remove dissolved solids included in a fluid introduced by the water purification voltage to generate purified water. Here, the generated purified water may have a target TDS value.

Thereafter, when a first time is reached (t=1), an operation of applying the regeneration voltage to the second filter unit may be performed. While the water purification voltage is being applied to the first filter unit, the regeneration voltage may be applied to the second filter unit to regenerate the electrodes of the second filter unit. Thus, it provides against saturation of the electrodes of the first filter unit.

Thereafter, when a second time is reached (t=t2), an operation of stopping the application of the regeneration voltage to the second filter unit may be stopped. As discussed above, a time required for removing the dissolved solids adsorbed on the electrodes by applying the regeneration voltage to the electrodes may be shorter than a time required for saturating the electrodes by applying the water purification voltage to the electrodes. Thus, when regeneration of the electrodes of the second filter unit is completed, the application of the regeneration voltage to the second filter unit may be stopped.

Thereafter, when a third time is reached (t=t3), an operation of applying the water purification voltage to the second filter unit may be performed. Namely, while the water purification voltage is being applied to the first filter unit, the water purification voltage may be applied to the second filter unit. As discussed above, after the lapse of the third time, when a predetermined time has passed, the TDS removal rate of the first filter unit starts to be reduced. Here, if the water purification voltage starts to be applied to the second filter unit after the TDS removal rate of the first filter unit has decreased to reach zero, purified water including TDS equal to or greater than the target TDS value may be provided to the user. Thus, in order to avoid this situation, when the third time is reached, the water purification voltage may start to be applied also to the second filter unit. Namely, as illustrated in FIG. 6, by starting to apply the water purification voltage to the second filter unit in advance, the TDS removal rate may be uniformly maintained at the level of A_WATER PURIFICATION.

Thereafter, when a fourth time is reached (t=t4), an operation of applying the regeneration voltage to the first filter unit may be performed. As discussed above, the TDS removal rate of the first filter unit is decreased due to the saturation of the electrodes of the first filter unit. Thus, the first filter unit may be regenerated by applying the regeneration voltage thereto.

Thereafter, when a fifth time is reached (t=t5), an operation of stopping the application of the regeneration voltage to the first filter unit may be performed. As discussed above, regeneration of the electrodes may be faster than saturation of the electrodes. Thus, when regenerating of the electrodes of the first filter unit is completed, the application of the regeneration voltage to the first filter unit may be stopped.

Thereafter, when a sixth time is reached (t=t6), the water purification voltage may be applied to the first filter unit to enable the first filter unit to perform a water purification operation. In this manner, by iteratively performing the operations from t=0 to t=t6, the purified water can be continuously provided while maintaining the TDS value of provided purified water at the target TDS value.

A method for controlling an apparatus for water treatment using capacitive deionization according to another embodiment of the present invention is related to an apparatus for water treatment using capacitive deionization including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively. In detail, the method for controlling an apparatus for water treatment using capacitive deionization will be described with reference to FIG. 7.

First, an operation of applying the water purification voltage to the first filter unit may be performed. Thus, the first filter unit may remove dissolved solids included in a fluid introduced by the water purification voltage to generate purified water.

Thereafter, when a TDS concentration of the first filter unit is equal to or less than a pre-set purification water reference value A1, an operation of applying a water purification voltage to the second filter unit may be performed. As discussed above, the TDS concentration may be measured by using a TDS sensor (not shown), or the like. When the TDS concentration of the first filter unit is decreased to be equal to or less than the pre-set water purification reference value A1, it means that the TDS of the purified water generated by the first filter unit has been increased, so the water purification voltage is applied to the second filter unit in advance to maintain the TDS value of the discharged purified water at the target TDS value.

Thereafter, when the TDS concentration of the first filter unit is equal to or less than a pre-set regeneration reference value A2, an operation of applying a regeneration voltage to the first filter unit may be performed. When the TDS concentration of the first filter unit is equal to or less than the regeneration reference value A2, it may be determined that the electrodes of the first filter unit are in a saturated state. Thus, the regeneration voltage may be applied to the electrodes of the first filter unit to regenerate the same.

Thereafter, when the TDS concentration of the second filter unit is decreased to be equal to or less than the water purification reference value A1, an operation of applying the water purification voltage to the first filter unit may be performed. As discussed above, when the TDS concentration of the second filter unit starts to be decreased to be equal to or less than the water purification reference value A1, the water purification voltage may be applied to the first filter unit in advance in preparation for saturation of the electrodes of the second filter unit.

Thereafter, when the TDS concentration of the second filter unit is equal to or less than the regeneration reference value, an operation of applying the regeneration voltage to the second filter may be performed. As discussed above, when the TDS concentration of the second filter unit is decreased to be equal to or less than the regeneration reference value, it may be determined that the electrodes of the second filter unit have been saturated. Thus, the regeneration voltage may be applied to the second filter unit to regenerate the electrodes thereof.

Thereafter, when the TDS concentration of the first filter unit is equal to or less than the water purification reference value A1, an operation of applying the water purification voltage to the second filter unit is performed. Namely, by iteratively performing the respective operations from the beginning, the purified water can be continuously provided, while maintaining the TDS value of the provided purified water at the target TDS value.

While the present invention has been shown and described in connection with the embodiments, it will be apparent to those skilled in the art that modifications and variations can be made without departing from the spirit and scope of the invention as defined by the appended claims.

The invention claimed is:

1. An apparatus for water treatment using capacitive deionization, the apparatus comprising:
   a first filter unit and a second filter unit allowing dissolved solids included in an introduced fluid to be adsorbed on electrodes to generate purified water when a water purification voltage is applied to the electrodes, and allowing the dissolved solids adsorbed on the electrodes to be desorbed to generate regenerated water when a regeneration voltage is applied to the electrodes, respectively; and
   a controller iteratively alternatively applying the water purification voltage and the regeneration voltage to the first filter unit and the second filter unit to generate purified water having a pre-set target total dissolved solids (TDS) value,
   wherein the controller controls the period of applying the regeneration voltage to the first filter unit and the second filter unit to be shorter than the period of applying the water purification voltage to the first filter unit and the second filter unit, and wherein one of the first filter unit and the second filter unit completes a regeneration operation and starts a water purification operation during the water purification operation of another of the first filter unit and the second filter unit, creating a time period in which both of the first filter unit and the second filter unit perform the water purification operation.

2. The apparatus of claim 1, wherein the first filter unit and the second filter unit comprises, respectively:
an inlet allowing the fluid to be introduced therethrough;
a purified water outlet allowing the purified water to be discharged;
a regeneration water outlet allowing the regenerated water to be discharged;
an electrode applying a voltage to the fluid; and
a water discharge valve opening the purified water outlet and closing the regenerated water outlet when the water purification voltage is applied to the electrode, and closing the purified water outlet and opening the regenerated water outlet when the regeneration voltage is applied to the electrodes.

3. The apparatus of claim 1, wherein the controller performs a water purification operation to apply the water purification voltage during a pre-set water purification period and a regeneration operation to apply a regeneration voltage during a pre-set regeneration period according to a pre-set operation pattern.

4. The apparatus of claim 3, wherein the operation pattern is iterative operations of first applying the water purification voltage to the first filter unit,
applying the regeneration voltage to the second filter unit when a first time is reached,
stopping the application of the regeneration voltage to the second filter unit when a second time is reached,
applying the water purification voltage to the second filter unit when a third time is reached,
applying the regeneration voltage to the first filter unit when a fourth time is reached, stopping the application of the regeneration voltage to the first filter unit when a fifth time is reached, and
applying the water purification voltage to the first filter unit when a sixth time is reached,
wherein the operations are iteratively performed, and the first time to the sixth time are sequential.

5. The apparatus of claim 1, further comprising:
a TDS sensor unit measuring a TDS concentration within the first filter unit to generate a first measured concentration, and measuring a TDS concentration within the second filter unit to generate a second measured concentration,
wherein the controller applies the water purification voltage and the regeneration voltage to the first filter unit and the second filter unit according to the first measured concentration and the second measured concentration.

6. The apparatus of claim 5, wherein after the water purification voltage is applied to the first filter unit,
the controller applies the water purification voltage to the second filter unit when the first measured concentration is equal to or less than a pre-set water purification reference value,
the controller applies the regeneration voltage to the first filter unit when the first measured concentration is equal to or less than a pre-set regeneration reference value, the controller applies the water purification voltage to the first filter unit when the second measured concentration is equal to or less than the water purification reference value,
the controller applies the regeneration voltage to the second filter unit when the second measured concentration is equal to or less than the regeneration reference value, and
the controller applies the water purification voltage to the second filter unit when the first measured concentration is equal to or less than the water purification reference value,
wherein the controller iteratively performs the operations.

7. A method for controlling an apparatus for water treatment using capacitive deionization including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively, the method comprising:
applying the water purification voltage to the first filter unit;
applying the regeneration voltage to the second filter unit when a first time is reached;
stopping the application of the regeneration voltage to the second filter unit when a second time is reached;
applying the water purification voltage to the second filter unit when a third time is reached;
applying the regeneration voltage to the first filter unit when a fourth time is reached;
stopping the application of the regeneration voltage to the first filter unit when a fifth time is reached; and
applying the water purification voltage to the first filter unit when a sixth time is reached,
wherein the first time to the sixth time are sequential, and the period of applying the regeneration voltage to the first filter unit and the second filter unit is shorter than the period of applying the water purification voltage to the first filter unit and the second filter unit, creating a time period in which both of the first filter unit and the second filter unit perform the water purification operation.

8. A method for controlling an apparatus for water treatment using capacitive deionization including a first filter unit and a second filter unit performing a water purification operation to allow dissolved solids included in an introduced fluid to be adsorbed on electrodes to generate purified water when a water purification voltage is applied to the electrodes, and performing a regeneration operation to allow the dissolved solids adsorbed on the electrodes to be desorbed to generate regenerated water when a regeneration voltage is applied to the electrodes, respectively, the method comprising:
applying the water purification voltage to the first filter unit;
applying the water purification voltage to the second filter unit when a target total dissolved solids (TDS) concentration of the first filter unit is equal to or less than a pre-set water purification reference value;
applying the regeneration voltage to the first filter unit when the TDS concentration of the first filter unit is equal to or less than a pre-set regeneration reference value;

applying the water purification voltage to the first filter unit when a TDS concentration of the second filter unit is equal to or less than the water purification reference value;

applying the regeneration voltage to the second filter unit when the TDS concentration of the second filter unit is equal to or less than the regeneration reference value; and applying the water purification voltage to the second filter unit when the TDS concentration of the first filter unit is equal to or less than the water purification reference value, wherein the period of applying the regeneration voltage to the first filter unit and the second filter unit is shorter than the period of applying the water purification voltage to the first filter unit and the second filter unit, and wherein one of the first filter unit and the second filter unit completes a regeneration operation and starts a water purification operation during the water purification operation of another of the first filter unit and the second filter unit, creating a time period in which both of the first filter unit and the second filter unit perform the water purification operation.

* * * * *